Figure 1:
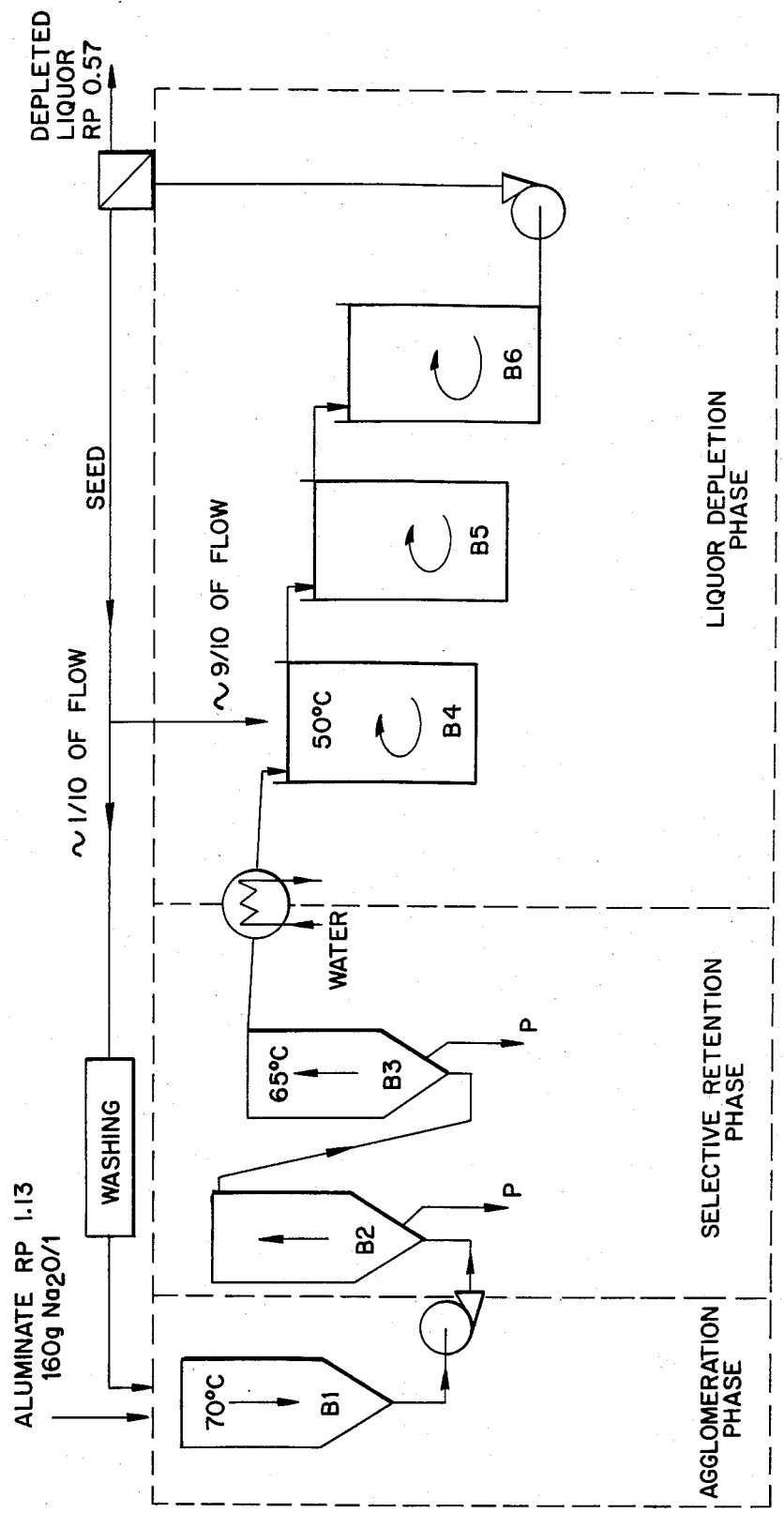

United States Patent [19]

Veyrier

[11] Patent Number: 4,617,179
[45] Date of Patent: Oct. 14, 1986

[54] PROCESS FOR EFFECTING SEEDING IN TWO PHASES FOR PRODUCING LARGE-GRAIN ALUMINA

[75] Inventor: Maurice Veyrier, Aix en Provence, France

[73] Assignee: Aluminium Pechiney, Paris, France

[21] Appl. No.: 799,749

[22] Filed: Nov. 19, 1985

[30] Foreign Application Priority Data

Nov. 22, 1984 [FR] France .................. 84 18135

[51] Int. Cl.$^4$ ............................................. C01F 7/02
[52] U.S. Cl. .................... 423/121; 423/122;
423/123; 423/124; 423/127; 423/629; 23/301;
23/302 R; 23/305 A; 75/108; 75/109; 75/121
[58] Field of Search .............. 23/305 A, 301, 302 R;
423/121, 122, 123, 124, 127, 629; 75/108, 109, 121

[56] References Cited

U.S. PATENT DOCUMENTS

| | | | |
|---|---|---|---|
| 4,234,559 | 11/1980 | Tschamper | 423/121 |
| 4,305,913 | 12/1981 | Anjier | 423/629 |
| 4,311,486 | 1/1982 | Yamada et al. | 423/629 |
| 4,364,919 | 12/1982 | Yamada et al. | 423/629 |

FOREIGN PATENT DOCUMENTS 1098284  3/1981  Canada.
0102403  9/1982  European Pat. Off..

Primary Examiner—John Doll
Assistant Examiner—Robert L. Stoll
Attorney, Agent, or Firm—Dennison, Meserole, Pollack & Scheiner

[57] ABSTRACT

The invention concerns a process for the precipitation of aluminium hydroxide by seeding in two phases, which is intended to produce at a high level of productivity alumina with large grains, referred to as 'sandy coarse', by precipitation in a succession of tanks in cascade relationship of a supersaturated solution of sodium aluminate coming from alkaline attack on bauxite in accordance with the BAYER process. The process comprises three stages:

in the first agglomeration stage, the supersaturated aluminate liquor is introduce into the tank, with an equivalent amount of terms of $Na_2O$ of between 110 and 175 g/liter, at a temperature of between 65° and 80° C., and seeding is effected with an amount of washed seed of between 20 and 120 g/l of aluminate, in the second stage, selective retention of the largest crystals of aluminium trihydrate formed is effected in the tanks, so as to produce a content of dry matter of between 300 and 800 g/liter of suspension, the whole of the aluminium trihydrate which is intended for the production of alumina is extracted in the course of or at the end of the second stage, in a third stage, referred to as a liquor depletion stage, an amount of seed of between 400 and 800 g/l of suspension, that is to say between 480 and 1200 g/liter of liquor, is introduced, at the end of the third stage, separation is effected on the one hand of a depleted aluminate liquor which is recycled in known fashion and on the other hand aluminium trihydrate with very fine grains, a small portion of which is recycled after washing as a seed for the agglomeration stage while the remainder is recycled as a seed to the liquor depletion stage.

11 Claims, 1 Drawing Figure

PROCESS FOR EFFECTING SEEDING IN TWO PHASES FOR PRODUCING LARGE-GRAIN ALUMINA

TECHNICAL FIELD OF THE INVENTION

The present invention concerns a process for effecting precipitation of aluminium hydroxide by seeding in two phases to produce, at a high level of productivity, large-grain alumina in which less than 10% of the grains have their smallest size less than 45 micrometers, from supersaturated solutions of alkali metal aluminates which are provided by the BAYER process for alkaline attack on bauxites.

The Bayer process which is widely described in the specialist literature is the essential process for the production of alumina which is intended to be converted into aluminium by igneous electrolysis. In that process, the bauxite is treated in a hot condition by means of an aqueous solution of sodium hydroxide, thus causing solubilisation of the alumina and the production of a supersaturated solution of sodium aluminate. After separation of the solid phase constituting the residue of the ore which has not been attacked (red mud), the supersaturated solution of sodium aluminate is generally seeded with aluminium hydroxide which is referred to hereinafter 'seed', in order to cause precipitation of an aluminium trihydroxide $Al(OH)_3$.

There are a number of industrial variations of the process for the production of aluminium trihydroxide by Bayer alkaline attack on bauxites, and they are usually put into two categories, one being known as the European process and the other being known as the American process.

In the European process, precipitation of the aluminium trihydroxide is effected in the course of the operation of decomposing an aqueous solution of sodium aluminate with a high level of concentration of caustic $Na_2O$, titrating from 130 to 170 grams of $Na_2O$ per liter of sodium aluminate solution to be decomposed. The expression 'concentration in respect of caustic $Na_2O$' is used to denote the total amount of $Na_2O$ expressed in terms of grams per liter in the sodium aluminate solution to be decomposed, both in the form of sodium aluminate and in the form of sodium hydroxide. In accordance with that process, an amount of trihydrate which is generally between 350 g/l and 600 g/l of suspension, acting as seed, is introduced into the sodium aluminate solution to be decomposed, decomposition of the solution generally being carried out at a temperature which is at most 55°. Such a process provides a high level of productivity of alumina, which may attain 80 g of $Al_2O_3$ per liter of the sodium aluminate solution, but the aluminium trihydroxide which is produced in that way is generally of fine grain size and, by roasting, gives an alumina, the fine nature of which is considered at the present time to be a nuisance in regard to igneous electrolysis, because of the dust that it produces.

In the American process, precipitation of the aluminium trihydroxide is effected by decomposition of an aqueous solution of sodium aluminate with a low level of concentration of caustic $Na_2O$, not exceeding 100 g of $Na_2O$ per liter of a solution of sodium aluminate to be decomposed. An amount of $Al(OH)_3$ acting as a seed is introduced into the sodium aluminate solution, the amount used being less than in the European process and being of the order of 100 g/l to 200 g/l of the aluminate solution to be decomposed; in contrast, decomposition in the American process is carried out at a higher temperature, for example 70° C. All those operating conditions in combination result in the production of an aluminium trihydroxide which is of larger grain size than that produced by the Euorpean process, and the large grains produced, after classification and roasting, give an alumina which is referred to as 'sandy coarse', with the grain size required for the production of aluminium by means of igneous electrolysis. However, due to a contrary effect, the above-indicated operating conditions give rise to a drop in the yield, which thus appears to be much lower than with the European process, generally being around 50 g of $Al_2O_3$ per liter of the aluminate solution when producing a sandy coarse alumina. Attempts to improve the level of productivity by a reduction in the decomposition temperature and introducing a larger amount of $Al(OH)_3$ as a seed into the solution of sodium aluminate to be decomposed, gave the result that the alumina of sandy coarse grain size was no longer produced and an alumina of smaller grain size was obtained instead.

STATE OF THE ART

For a long time now, as can be witnessed from the large number of publications in this art, many attempts have been made both in regard to the American process and the European process to arrive at a process for the production of aluminium trihydroxide of large grain size, while enjoying the benefit of the level of productivity of the European process.

Among the processes which have been put forward, some involve using the whole of the seed at the beginning of decomposition, as is the case with U.S. Pat. Nos. 3,607,113 and 3,649,184 and our patent application FR-A-2 529 877, but most of such processes provide for seeding in two phases, a small part of the seed being used at the beginning of the decomposition operation and the balance being added after a time that varies between 6 and 24 hours. The present invention falls into the category of 2-phase seeding processes.

A first two-phase seeding process is disclosed in U.S. Pat. No. 2,657,978, the purpose of which is to promote an increase in the level of productivity of aluminium hydroxide of large grain size, and which uses a procedure involving introducing the aluminium hydroxide acting as the seed in two periods, the first period involving introducing just the amount of seed required to produce crystals of large grain size while the second period involves introducing a fresh amount of seed. However from the results which are listed, the increase in productivity appears to be slight and is therefore not a very attractive proposition on an industrial scale.

Another two-phase seeding process (FR-A-2 440 916) provides two-phase decomposition of the supersaturated solution of sodium aluminate: the first phase of the decomposition procedure comprises introducing a controlled amount of a suspension of fine seed into the sodium aluminate solution, that phase taking place at a temperature of from 77° C. to 66° C. Then, in the second decomposition phase, a sufficient amount of seed of larger grain size is introduced into the cooled suspension produced in the first phase, in such a way that the combined amount of seed introduced in the two phases represents at least 130 g of aluminium trihydroxide per liter of solution to be decomposed, and at most 400 g/l.

The essential part of the improvement in productivity claimed is due to a cause which a totally independent of the decomposition process: it was assumed that the procedure resulted in the decomposition of more highly supersaturated liquors. In actual fact, this process cannot claim to approach the level of productivity in decomposition in the European process for many reasons: according to the examples given in the above-indicated patent, the amount of seed used is substantially lower: less than 400 g/liter of liquor as against at least 600 g in the European processes and up to 2000 g/liter of liquor in our application FR-A-2 529 877. In addition, the alumina contained in the decomposing vessels includes a large proportion of large grains and accordingly constitutes a seed with a low specific surface area.

Finally, the level of concentration of the liquors involved in the decomposition procedure is lower: 125 g of $Na_2O$/liter as against 150 to 170 g/l in the European processes, the level of productivity varying almost proportionally with the level of concentration.

French patent FR-A-1 391 596 and U.S. Pat. No. 305,913 propose two relatively similar processes for decomposition in a step-wise fashion of a supersaturated solution of sodium aluminate at a temperature of from 74° C. to 85° C., the amount of seed introduced being from 70 to 140 g/l of solution of sodium aluminate to be decomposed. However, although those processes produce an alumina of grain size which is apparently favourable, they have only a low level of productivity in comparison with the European process. There are at least two reasons for that:

the amount of seed used is very small: less than 200 g/liter of aluminate as against 600 g/l in most of the European processes and up to 2000 g in our application FR-A-2 529 877;

the level of concentration of soda is low: 140 g of $Na_2O$ (that is to say, 240 g expressed in terms of $Na_2CO_3$/liter) as against 150 to 170 g/l in the European decomposition processes.

In addition, the above-indicated process comprise two circuits in parallel in relation to the liquor and in series in relation to the solids, there are a number of qualities of seed, all of which requires many grading and liquid/solid separation apparatuses. That gives rise to burdensome levels of capital investment and a relatively complicated mode of operation.

It thus seems that many paths have been followed in the attempts to arrive at a process for the decomposition of a supersaturated solution of sodium aluminate, which concurrently enjoys the qualities which are to be found in the American processes and the European processes alone, that is to say, which permits the production of an alumina of coarse grain size (sandy coarse type), with a high level of productivity. However, the man skilled in the art is forced to recognise that the proposed processes give incomplete solutions which are generally unsatisfactory since, in order to arrive at an alumina of acceptable grain size, it is generally necessary to suffer a drop in the high level of productivity of alumina, that the man skilled in the art is no longer able to accept on an industrial scale.

Thus, in French patent No. 2 318 113 (=CA 1 098 284), there is claimed the production of large-grain alumina with a level of productivity which approaches that obtained in the European processes. Nonetheless, as that process does not involve any agglomeration phase, the increase in the size of the crystals is essentially produced by crystalline growth. Now, it has been irrefutably established that the alumina which is produced by crystalline growth is much more fragile than that which is produced by the agglomeration of the seed crystals and the crystalline growth which results therefrom.

In our patent application FR-A-2 529 877 (PECHINEY), we proposed a process for the production of aluminium trihydroxide in which 10% at most of the particles are smaller than 45 micrometers, and with an enhanced level of productivity, comprising, in the decomposition zone of the Bayer process comprising a succession of stages in cascade relationship, creating a suspension with a high proportion of dry matter of at least 700 g/l and preferably 800 to 2000 g/l of alkali metal aluminate, and seeding, in the decomposition zone, by means of crystals of aluminium trihydroxide of non-selected grain size, and separating, in the final classification zone, the portion of large grain size which constitutes the production and the remaining suspension which, after a fresh separation operation, constitutes the non-selected seed which is recycled to the decomposition zone.

Finally, European patent application EP-A-102403 describes a process involving five successive steps, an alternative embodiment of which may comprise seeding in two phases:

In accordance with that process, the supersaturated solution of sodium aluminate, which is mixed at a level of concentration of sodium hydroxide of from 200 to 300 g/l, considered as $Na_2CO_3$, passes at temperatures of between 80° and 65° C. through a cascade array of agglomerators which are connected in series, and a part of the aluminium oxide is added as aluminium oxide hydrate and in the course of that procedure; in the first agglomerator, a suspension of fine seed crystals is added, and the first agglomerator has a solid matter content of from 10 to 50 g/l of aluminate, considered as aluminium oxide ($Al_2O_3$); the solution of sodium aluminate containing the agglomerates then passes through a first cascade array of crystallisers which are connected in series and a part of the aluminium hydroxide is agitated in such a way that, in each crystalliser, at least 80% of the total volume has a high proportion of solid matter and the upper part of the residual volume has a proportion of solid matter considered as aluminium oxide ($Al_2O_3$) that does not exceed 20 g/l and in particular does not exceed 3 g/l, and in which the lower and upper parts of the solution, only after being mixed together, pass into the following crystalliser; the combined flows which are found in the last crystalliser and which are formed by the flow passing into the first crystalliser and by the aluminium oxide hydrate formed in the first cascade array of crystallisers, are cooled, reducing the temperature from 55° C. to 45° C.; the flows are agitated in a second cascade array of crystallisers which are disposed in series in such a way that, in each crystalliser, at least 80% of the total volume has a high proportion of solid matter and the upper part of the residual volume has a proportion of solid matter, expressed as aluminium oxide ($Al_2O_3$), that does not exceed 20 g/l and in particular does not exceed 3 g/l and finally, the crystals in suspension which are extracted from the last crystalliser of the second cascade array of crystallisers are split up into fine or medium inoculation crystals, as appropriate, and into coarse crystalline rejects. That process claims a level of productivity of the order of 80 grams per liter (expressed as $Al_2O_3$) of aluminium trihydrate crystals.

Although the level of productivity is an attractive proposition, it is limited for the following reason: the alumina which circulates in the decomposing vessels comprises the fraction which will be taken off for the production. Accordingly, it is necessarily of large grain size and has a low specific surface area. It therefore constitutes a seed which is of low effectiveness, bearing in mind that the decomposition kinetics are directly proportional to the surface area of the seed used.

SUBJECT OF THE INVENTION

The subject-matter of the present invention is a continuous process for the production of aluminium trihydrate which combines both a high level of productivity (which can attain 85 to 87.5 g/l expressed in terms of $Al_2O_3$), a granulometry which is in accordance with the requirements of the producers of aluminium (substantially less than 10% of grains smaller than 45 micrometers) and 'solidity' of the grains, which reduces the undesirable formation of fines in the operations of roasting, transportation and use of the alumina, in particular in electrolysis works.

This process is characterised by three successive stages which are carried out in a cascade array of tanks disposed in series: an agglomeration stage in the course of which the fine particles of alumina are agglomerated to form grains of larger size, a second stage which provides for consolidation of the grains and an increase in granulometry by selective retention of the large grains, at the end of which the whole of the production is removed, and, finally, a stage involving depletion of the liquors with the massive addition of fine seed with a large specific surface area, the last stage producing both the seeds for the first stage and the whole of the seed for the liquor depletion stage.

FIG. 1 diagrammatically shows the way in which the process is carried into effect, with the succession of tanks in cascade relationship, the number of which has been limited in order not to encumber the drawing.

It will be noted that the selective retention tanks are supplied by way of their bottoms to effect the formation of a fluidised bed which is one of the ways of effecting selective retention of the large grains.

In the first stage, referred to as the agglomeration stage, a conventional aluminate liquor is introduced into the tank B1, the liquor having an equivalent content in terms of $Na_2O$ of between 110 and 175 g/liter, and an alumina/caustic $Na_2O$ weight ratio of the order of 1.10 to 1.20 at a temperature of between 65° and 80° C. and generally between 70° and 75° C.

The aluminate solution is seeded with a fine seed (50% <45 micrometers for example) with a high specific surface area, which comes from the third stage, referred to as the 'liquor depletion stage', as will be described hereinafter. The agglomeration phase is carried out at a temperature of between 65° and 80° C. (on average 70° C.), for a period of from 6 to 20 hours (on average from 8 to 10 hours) and the amount of seed used is between 20 and 120 g of trihydrate per liter of aluminate, with an average of the order of 30 to 50 g/l.

The above-indicated conditions in respect of temperature and seeding result in the production of an alumina with large grains, as from the early hours of the decomposition procedure, by virtue of a low rate of nucleation and a high rate of agglomeration of the nuclei.

In the tank B1, the aluminate liquor is circulated in a downward direction. That circulation tends to 'expand' the suspension in the tank in such a way that the concentration of the aluminium trihydrate suspension in the tank is lower than the concentration at the intake and at the outlet. In addition, the large particles have a residence time and therefore a level of concentration which is reduced in comparison with the fines, which, combined with the absence of any form of agitation, operates in such a way as to promote agglomeration.

The second stage is carried out at a lower temperature, so as to increase the speed of decomposition of the aluminate, of the order of 50° to 65° C. (on average 60° C.) for a period of from 10 to 25 hours (on average 15 hours), and the aim is to produce a proportion of 'dry matter' in the tanks that is greater than 300 g/l and preferably between 400 and 800 g/liter (the term 'dry matter' is used to denote the dry aluminium trihydrate expressed in terms of $Al(OH)_3$).

The essential feature of the second stage is that selective retention of alumina is produced therein, in relation to the granulometry thereof, by providing the rapid circulation of the finest particles of trihydrate and extending the residence time of the largest particles, so as to provide for both an increase in the size thereof and consolidation thereof. Selective retention of the large grains is achieved by suitable means such as for example the procedure referred to as the fluidised bed procedure as described in French patent No. 1 187 352 (in the name of Société d'Electrochimie-d'Electrométallurgie et des Aciéries Electriques d'Ugine).

In the course of this second stage for the selective retention of the large grains which is achieved by an increase in the length of the residence time in a zone in which the aluminate decomposition mechanism is still operating rapidly, the alumina selectively precipitates on the large grains, which causes deformation of the granulometric histogram, to the favour of the large grains of alumina, and consolidation of the grains by an improvement in their shape factor: they go from a fragile irregular shape to a more rounded shape which is better able to resist attrition. It is known in fact that the grains produced by an agglomeration process followed by nourishing are particularly solid.

To achieve that double improvement in regard to the size and the shape of the grains, selective retention is effected in respect of the grains of aluminium trihydrate which are of a mean size of at least 50 to 60 micrometers so as to ensure therefor a mean residence time in the tank that is at least equal to twice and preferably from 5 to 10 times the mean residence time of the aluminate liquor, which is achieved by providing for a speed of rise of the liquor in the upper part of the tank that is between 0.5 and 3 meters per hour and preferably between 1 and 2 meters per hour.

It is important to note that the latter mechanism for selectively increasing the size of the large grains of alumina is not sensitive to deposits of oxalate and to other organic impurities. That is an advantage in comparison with granulometric control processes which are based exclusively on the agglomeration mechanism alone which is sensitive to such impurities. Moreover, the deposit of alumina improves the 'solidity' of the grains, by imparting thereto more rounded forms which make them less vulnerable to handling: it is that that we have referred to as 'consolidation'.

In practice, the successive tanks B3 in the second phase are supplied by way of the bottom, from the overflow of the previous tank, except in the case of the first cementation tank B2 which is supplied with the liquor that is taken off in the lower part of the germination tank B1. In accordance with that procedure, the rising flow, in contrast to what happened in the tank B1, contracts the suspension, the level of concentration of which substantially increases, which is a factor operating to produce an elevated level of productivity.

Irrespective of the procedure used for providing for selective retention of the large grains, the production (P)—and this is one of the original points of the process—is taken off in its entirety in this stage. It is characterised by a proportion of fine product of smaller than 45 μm that is less than 5% and by a yield which can exceed 85 kg (expressed in terms of $Al_2O_3$) per cubic meter of aluminate liquor which passes into tank No 1.

The production can be removed either from each of the tanks in the second phase or from the last tank of the second phase; in the latter case, it is appropriate to ensure that the large grains circulate from one tank to the following tank.

The third stage, referred to as the liquor depletion or exhaustion stage (tanks B4, B5 and B6) is characterized by a massive injection of fine seeds (from 400 to 800 g of trihydrate per liter of suspension and on average 750 g/l), with a high specific surface area. The temperature is fixed at between 45° and 55° C. (on average 50° C.) and the duration of the third phase is from 10 to 20 hours (on average 15 hours) and agitation is effected in the usual fashion.

Removed at the discharge from the last tanks (B6) is the suspension which contains about 800 g/l of dry matter per liter of suspension, comprising approximately 40% of fines (smaller than 45 μm), which, after separation by filtration, in the usual fashion, provides on the one hand a depleted liquor (in which the sodium aluminate content has fallen to a ratio by weight of approximately 0.57) which is concentrated and recycled to the bauxite attack stage, and on the other hand, aluminium trihydroxide of which a small portion (approximately 1/10th) is used, after washing (to remove the organic compounds and in particular sodium oxalate), as a seed in the first seeding stage, the remainder thereof being recycled as the seed to the head of the liquor depletion zone. The washed fraction of seed may be added in its entirely at the beginning of the first stage or it may be graded into fine seed which is added at the beginning of the first stage and medium seed which is added at the beginning of the second stage.

EMBODIMENT

Using an industrial BAYER alumina production unit, a supersaturated solution of sodium aluminate which was produced by the attack at a temperature of 245° C. on a mixture of French and Australian bauxites of the following composition, expressed in percent by weight, was introduced:

| COMPOSITION | BAUXITE | |
| --- | --- | --- |
| | FRENCH | AUSTRALIAN |
| firing loss | 13.47 | 23.88 |
| $SiO_2$ | 5.3 | 5.3 |
| $Al_2O_3$ | 52.5 | 54.8 |
| $Fe_2O_3$ | 24.0 | 13.0 |
| $TiO_2$ | 2.7 | 2.6 |
| CaO | 1.8 | 0.05 |
| $V_2O_5$ | 0.08 | 0.04 |
| $P_2O_5$ | 0.20 | 0.08 |
| Organic C | 0.15 | 0.25 |

The composition of the sodium aluminate solution to be decomposed was as follows:

| | |
| --- | --- |
| Caustic $Na_2O$: | 160 g/l |
| Carbonated $Na_2O$ | 18 g/l |
| $Al_2O_3$ | 181 g/l |
| $Al_2O_3$/caustic $Na_2O$ | 1.13 |
| Organic C | 12 g/l |

The sodium aluminate solution to be decomposed was introduced into the agglomeration tank at a rate of 120 m3 per hour and at a temperature of 70° C., with the simultaneous addition of 45 kg per m3 of seed coming from the depletion phase and previously washed to remove the organic compounds (oxalate).

The whole of the aluminate liquor which was extracted by way of the bottom of the agglomeration tank in which it passed a residence time of on average 8 hours was adjusted to a temperature of 60° C. by passing it through an exchanger, and then passed to the lower part of the first tank of the second zone.

That zone comprised three tanks in series, providing the liquor with a residence time of 18 hours; the tanks were supplied by way of their lower part and operated on the basis of the fluidised bed principle described in FR-A-1 187 352. The apparent rate of rise of the liquid in the upper part of the tank was 1.6 m/h. That rate does not permit the grains which are larger in diameter than 60 μm to be entrained towards the tank overflow; they are therefore retained therein until they are removed as the production alumina. The amount of alumina in the tanks being 650 g/l of suspension, the mean residence time of the grains of a diameter of greater than 60 μm is between 4 and 5 times greater than that of the liquor. In contrast, grains with a diameter of less than 60 μm have a residence time which increasingly approaches the residence time of the liquor, in proportion to decreasing diameter. The alumina taken off as the production is removed by means of a battery of cyclone separators.

The liquor issuing from that zone contains about 20 g/l of fine alumina in suspension; it is cooled to 50° C. and mixed with 1090 kg/m3 (that is to say 750 g/l of suspension) of fine seed, containing 40% of grains smaller than 45 μm and with a specific surface area of 820 cm2/g. That suspension is agitated in tanks providing a residence time of 16 hours, and then filtered. The alumina is recycled as a seed to the beginning of the third phase after the portion which, after washing, is intended to be used as a seed in the first phase has been taken off. The liquor issuing from the filtration operation, in which the $Al_2O_3$/caustic $Na_2O$ ratio has fallen from 1.13 to 0.57 is recycled to the evaporation shop and then to the operation for attacking a fresh amount of bauxite.

The results obtained are summarised below:

productivity of the aluminate liquors: 87.5 kg of $Al_2O_3$/m3 of aluminate liquor introduced at the head end, granulometry of the alumina produced: cumulative material passing at:

| 45 μm | 64 μm | 96 μm | 128 μm |
| --- | --- | --- | --- |
| 3% | 14% | 58% | 92% | attrition index of the roasted product, in accordance with the modified version of the Forsythe-Hertwig test: 11; (N.B. this method is described in the following publication: FORSYTHE W L & HERTWIG W R Attrition characteristics of fluid cracking catalysts. Ind and Engr Chem 41, pages 1200–1206.

CONCLUSION

Carrying the invention into effect made it possible to produce an alumina of excellent granulometric quality since it contains only 3% of substance smaller than 45 μm.

The level of productivity of the liquors is the same as that which is obtained in European processes for producing fine alumina.

I claim:

1. A two phase seeding process for production of large grain, sandy coarse alumina having less than about 10% by weight of its grains of a size less than about 45 micrometers, by precipitation in a succession of tanks in cascade relationship of a supersaturated solution of sodium aluminate from the alkaline attack on bauxite in accordance with the Bayer process, comprising the steps of:

(a) in a first, agglomeration stage, introducing supersaturated aluminate liquor into a first tank, said liquor having a content equivalent to 110 to 175 grams $Na_2O$ per liter, at a temperature of 65° to 80° C., and seeding said liquor with washed aluminum trihydrate seed in an amount of 20 to 120 grams per liter of aluminate, with downward circulation of said liquor, but in the absence of agitation, to precipitate alumina;

(b) in a second stage, transferring said liquor with precipitated alumina from the bottom of said first tank to at least one second tank, and selectively retaining the largest grains of alumina formed, so as to produce a content in said tank of dry matter of 300 to 800 grams per liter of suspension, then removing from said second tank said largest grains of alumina having a mean size of at least 50 to 60 micrometers, wherein the liquor in the upper part of said second tank rises at a rate of 0.5 to 3 meters per hour, and the mean residence time of said largest grains in said second tank is at least twice the residence time of said aluminate liquor;

(c) in a third, liquor depletion stage, transferring said liquor to at least one further tank, and introducing into said liquor, alumina seeds in an amount of 400 to 800 grams per liter of suspension and 480 to 1200 grams per liter of liquor to further precipitate alumina from said liquor; and (d) at the end of said third stage, separating said aluminate liquor which is depleted, from alumina having very fine grains, at least 40% by weight of said grains having a size less than about 45 microns, recycling said liquor to the alkaline attack on bauxite in said Bayer process, recycling no more than about 10% by weight of said very fine grains as seeds in said first, agglomeration stage, and recycling the remainder of said very fine grains as seed in said liquor depletion stage.

2. A process according to claim 1, wherein said very fine grains for recycling as seeds in said first, agglomeration stage are washed and are graded according to size into very fine grains and larger grains, said very fine grains resulting from grading being recycled as seeds in said first, agglomeration stage, and said larger grains being recycled to said second stage at the beginning of said second stage.

3. A process according to claim 1, wherein the seeds introduced in said third stage have a specific surface area of about 820 $cm^2$ per gram.

4. A process according to claim 1 characterised in that the second stage is carried out at a temperature of from 50° to 65° C.

5. A process according to claim 1 characterised in that, in the second stage, the mean residence time of the liquor is between 10 and 25 hours.

6. A process according to claim 1 characterised in that, in the second stage, the proportion of dry matter is between 500 and 750 grams per liter of suspension.

7. A process according to claim 1 characterised in that, in the second stage, the mean residence time of the grains of aluminium trihydrate of a dimension that is at least equal to 50 to 60 micrometers is between 5 and 10 times the mean residence time of the aluminate liquor.

8. A process according to claim 1 characterised in that the third stage is carried out at a temperature of between 45° and 55° C.

9. A process according to claim 1 characterised in that the duration of the third stage is between 10 and 20 hours.

10. A process according to claim 1, wherein the mean rate of rise of liquor in the tank is between 1 and 2 meters per hour.

11. A process according to claim 7, wherein the mean rate of rise of liquor in the tank is between 1 and 2 meters per hour.

* * * * *